Aug. 24, 1965  A. D. HERTZOG  3,202,272
FOOD CONTAINER
Filed March 16, 1964
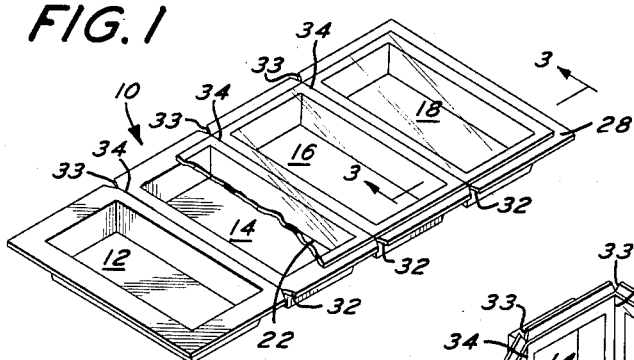
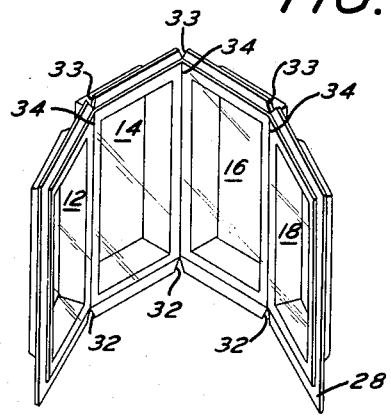
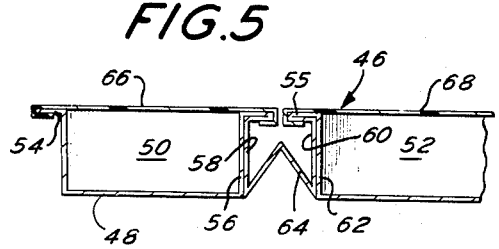
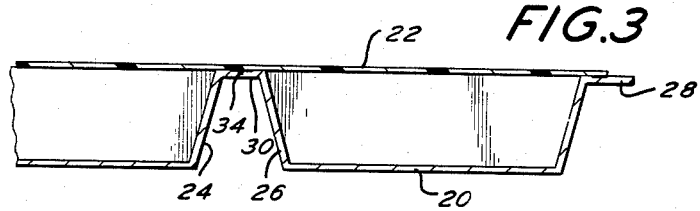
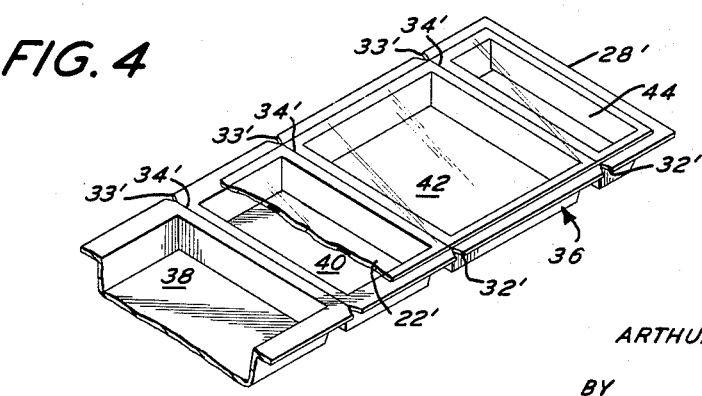
INVENTOR
ARTHUR D. HERTZOG
BY *Arthur H. Seidel*
ATTORNEY

United States Patent Office 3,202,272
Patented Aug. 24, 1965

3,202,272
FOOD CONTAINER
Arthur D. Hertzog, 116 N. 11th St., Allentown, Pa.
Filed Mar. 16, 1964, Ser. No. 352,245
6 Claims. (Cl. 206—56)

Reference is made to a copending application Serial No. 115,375, filed June 7, 1961, now Patent No. 3,127,984, granted April 7, 1964, by the same inventor relating to a Lunch Kit of which this application is a continuation-in-part.

This invention relates to a food container. More particularly, it relates to a compartment food container that is adapted to be folded.

In my copending application, I disclose a lunch kit which enables a person to partake of hot or cold liquids as well as a plurality of different hot or cold solid foods. The solid foods are disposed within a compartmented container capable of being folded so as to be readily disposed within an annular space in an insulated container that is part of said lunch kit.

The novel food container of the present invention is constructed so as to sealingly retain the food in its compartments and yet be capable of being folded for disposition in said lunch kit.

It is an object of the present invention to provide a novel food container.

It is another object of the present invention to provide a novel foldable food container.

It is another object of the present invention to provide a novel compartmented food container that is foldable. It is still another object of the present invention to provide a novel compartmented food container that is foldable for disposal within an insulated lunch kit.

It is yet another object of this invention to provide a novel compartmented food container in which each compartment is sealed against leakage, yet the container is foldable.

It is still a further object of this invention to provide a novel compartmented food container capable of receiving different solid foods within the compartments, while making said container out of only two elements.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view of the food container according to one embodiment of this invention.

FIGURE 2 is another perspective view of the invention showing the food container partially folded.

FIGURE 3 is a partial longitudinal sectional view of the food container taken along the lines 3—3 of FIGURE 1.

FIGURE 4 is a partial perspective view of the food container according to this invention, having compartments of different sizes.

FIGURE 5 is a partial longitudinal view of a food container according to the second embodiment of this invention.

Referring to the drawings in detail, wherein like numerals indicate like elements, there is shown in FIGURE 1 a perspective view of a food container designated generally as 10.

As shown, the food container 10 is divided into four compartments or cavities 12, 14, 16 and 18, although more or less compartments may be used. The compartments are adapted to contain a variety of solid foods, such as would complement each other to make up a complete meal. For example, compartment 12 may contain meat, while compartments 14 and 16 may contain vegetables, and compartment 18 may contain a dessert or the like.

The partial longitudinal sectional view of FIGURE 3 shows the compartmented food container 10 as comprising a bottom wall 20 and a top wall 22. The bottom wall 20 of container 10 is folded so as to provide the compartments 12–18. Each compartment is separated by two thickness of the bottom wall 20 like the upfolded portions 24 and 26. The bottom wall 20 is provided with a flange 28 around its entire periphery adjacent the open end of compartments 12–18. Top wall 22 overlaps the flange 28 and is attached thereto, thus sealing compartments 12–18. It should be noted that top wall 22 is also in contact with the intermediate portion 30 between the portions 24 and 26 of the bottom wall 20.

The flange 26 around the entire periphery of the bottom wall 20 is provided with V-shaped notches 32 adjacent each of the portions 24 and 26 thereof. A crease 34, extending between the notches 32, is provided in the intermediate portion 30 of the bottom wall 20. The V-shaped notches 32 and creases 34 cooperate to provide a means by which the container 10 may be easily folded, as shown in FIGURE 2. The food container 10 is folded to the extent that will permit it to be placed in an annular space in an insulated lunch kit.

The bottom wall 20 and the top wall 22 can be made from a light weight material capable of withstanding high temperatures such as sheet aluminum. If high temperatures are not needed, that is if the food in the compartments is not to be heated, the top wall can be made of a transparent plastic material. If a plastic material is used to form the top wall 22 it can be sealed to the flange 28 by the application of heat thereto. If the top wall 22 is made from aluminum or another metal foil it can be attached to the flange 28 by extending it beyond the edge thereof and then folding it around the edge. If desired, a seal may be maintained between the compartments 12–18 by crimping the top wall 22 into the bottom wall 20 when the crease 34 is made.

Thus the food container 10 is capable of retaining solid foods which may be packaged in a frozen state, heated within an oven, and then disposed within an annular space in a specially constructed insulated lunch kit which will keep it warm. In the alternative, the food may be maintained in a frozen or cold state in the lunch kit.

In the embodiment shown in FIGURE 4 the food container, designated generally as 36, is constructed the same as the food container shown in FIGURES 1–3. However, in this embodiment the size of the compartments 38, 40, 42 and 44 is different so that they may contain food portions of varying sizes.

FIGURE 5 is a partial longitudinal sectional view of a third embodiment of the invention, comprising a food container designated generally as 46.

The food container 46 comprises a single piece bottom wall 48 folded so as to form the compartments 50 and 52. As shown the construction is such that each compartment is provided with a flange 54 and 56 around its entire perimeter. This is done by folding the bottom wall 48 back upon itself to form a double wall thickness. Numerals 56–62 indicate the portion of bottom wall 48 that forms the flange and double side walls of the compartments.

Bottom wall 48 is disposed between compartments 50 and 52 so as to form an inverted V-shaped portion 64. In this way, the compartments 50 and 52 are attached, yet they can be folded for disposition in the insulated lunch kit. The inverted V-shaped portion also has the effect of providing an accordion-like action between compartments. This makes the adjustment of the food container 46 for placement into the annular space of the lunch kit much easier.

Each compartment is provided with a top wall, such as walls 66 and 68. The top walls overlap the flanges 54 and 55. The top walls 66 and 68 are attached to the flanges 54 and 55, respectively, by folding their edges around the outer edge of the flange and sealing them thereto either by the application of heat or by crimping. The construction shown in FIGURE 5 has the advantage of providing a complete seal around each compartment. Therefore, the compartments are sealed from one another, and liquids, such as a sauce or the like, cannot run over into another compartment.

The present invention may be embodied in other specific forms without departing from the spirit or essential attributes thereof and, accordingly, reference should be made to the appended claims, rather than to the foregoing specification as indicating the scope of the invention.

I claim:

1. A container comprising a single sheet of material, a series of discrete cavities having open ends formed in said sheet, said sheet being folded so that each cavity has a flange adjacent its open end separate and spaced from the flange of an adjacent cavity, said sheet also being folded so that a portion of said sheet connects adjacent cavities below said flanges, said portion including means for bending ajacent cavities relative to each other.

2. A container comprising a bottom wall made from a single sheet of material, a series of discrete cavities having open ends formed in said sheet, said sheet being folded so that each cavity has a flange adjacent its open end separate and spaced from the flange of an adjacent cavity, a portion of said sheet connecting adjacent cavities below said flanges, said portion including means for bending adjacent cavities relative to each other, and a top wall of said container, said top wall comprising a plurality of individual sheets supported by the flanges of each discrete cavity.

3. A container comprising a single sheet of material, a series of discrete cavities having open ends formed in said sheet, said sheet being folded so that each cavity has a flange adjacent its open end separate and spaced from the flange of an adjacent cavity, and means between adjacent cavities for bending them relative to each other, said means comprising a portion of said sheet folded to form an inverted V connecting adjacent cavities below said flanges.

4. A container comprising a single sheet of material, a series of discrete cavities having open ends formed in said sheet, said sheet being folded back upon itself so that each cavity has a doubled wall thickness spaced from an adjacent cavity, a portion of said sheet connecting adjacent cavities below said open ends, said portion including means for bending adjacent cavities relative to each other.

5. A container comprising a single sheet of material, a series of discrete cavities having open ends formed in said sheet, said sheet being folded so that each cavity has a flange adjacent its open end separate and spaced from the flange of an adjacent cavity and each cavity having a doubled wall thickness spaced from an adjacent cavity and means connecting adjacent cavities below said flanges for bending them relative to each other, said means comprising a portion of said sheet folded to form an inverted V between adjacent cavities.

6. A container in accordance with claim 1 wherein said flange surrounds the entire periphery of each individual cavity.

References Cited by the Examiner

UNITED STATES PATENTS

| | | | |
|---|---|---|---|
| 2,858,224 | 10/58 | Darrah | 229—28 |
| 2,917,216 | 12/59 | Despres | 206—56 |
| 2,955,044 | 10/60 | Tupper | 206—56 |

FRANKLIN T. GARRETT, *Primary Examiner.*

GEORGE O. RALSTON, *Examiner.*